J. P. BOYLE & W. A. INMAN.
PROCESS FOR MAKING ICE CAKES FROM RAW WATER AND APPARATUS FOR SAME.
APPLICATION FILED OCT. 30, 1915.
1,279,239.
Patented Sept. 17, 1918.
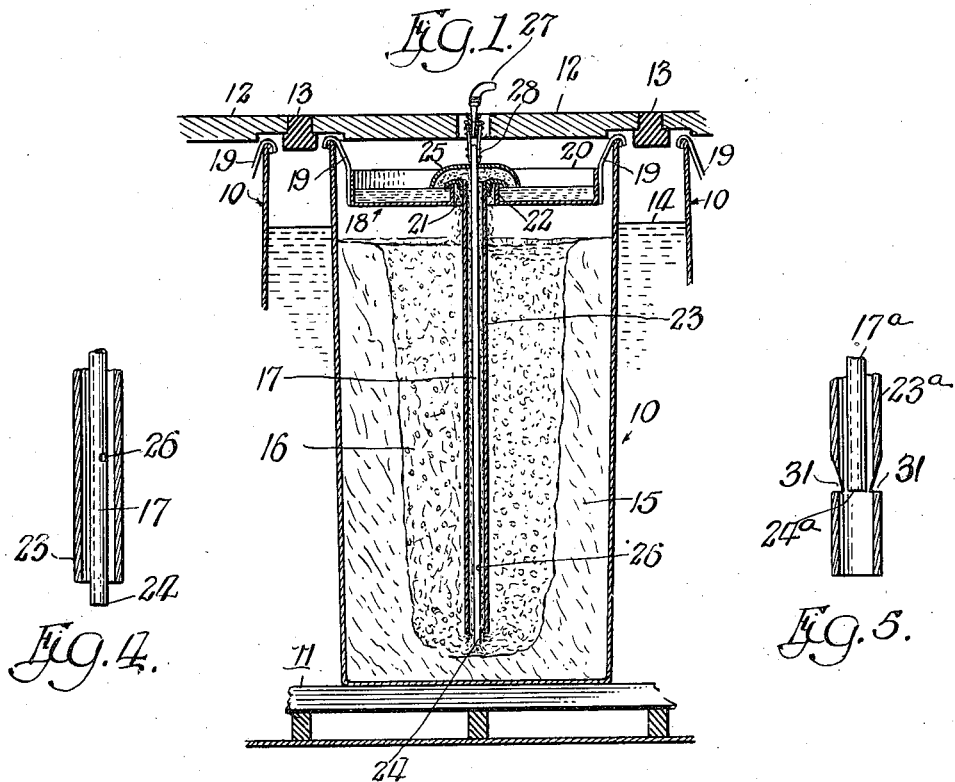
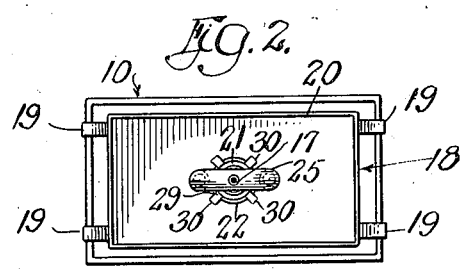
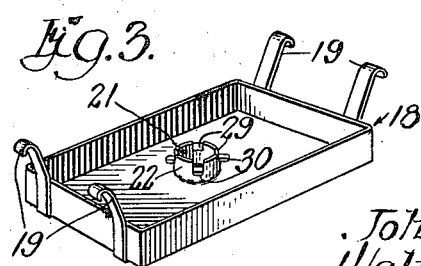

UNITED STATES PATENT OFFICE.

JOHN P. BOYLE AND WALTER A. INMAN, OF CHICAGO, ILLINOIS; SAID INMAN ASSIGNOR TO SAID BOYLE.

PROCESS FOR MAKING ICE CAKES FROM RAW WATER AND APPARATUS FOR SAME.

1,279,239.  Specification of Letters Patent.  Patented Sept. 17, 1918.

Application filed October 30, 1915. Serial No. 58,767.

*To all whom it may concern:*

Be it known that we, JOHN P. BOYLE and WALTER A. INMAN, citizens of the United States, and residents of Chicago, in the county of Cook and State of Illinois, have invented certain new and useful Improvements in Processes for Making Ice Cakes from Raw Water and Apparatus for Same; and we do hereby declare that the following is a full, clear, and exact description thereof, reference being had to the accompanying drawings, and to the letters of reference marked thereon, which form a part of this specification.

This invention relates to a process for making clear, clean ice cakes from ordinary raw or non-distilled water such as lake water and the like, and also to an apparatus for carrying out the process, all of which will be hereinafter described and more particularly pointed out in the appended claims.

Ordinary raw, non-distilled water, although it may appear clear and clean, contains a considerable amount of suspended matter,—so much, in fact, that if ice is made from such water, it will not appear clear or clean. In freezing ice from lake or river water, as the process has been heretofore carried on, it has been customary to agitate the water during the freezing process, usually by means of a jet of air directed into the body of the water. This keeps the suspended particles within the water continuously in movement with the result that as the water freezes from the outer walls of the can, toward the center, the heavier, suspended matter will be prevented from adhering to the surface of the frozen ice wall. By this process of agitation the suspended matter is gradually driven toward the center of the forming ice cake, where it is finally collected in a comparatively small body of water. This turbid, dirty water core is then withdrawn and is replaced by clean water. The ice walls surrounding this core are washed with a stream of water to dislodge any particles that may adhere to them after the said water core is removed.

This process for freezing raw water is apparently tedious and expensive and the expense is increased by reason of the fact that the cold, approximately freezing water removed from the core is necessarily replaced by water of higher temperature so that it takes a much longer time to freeze the cake of ice than it would have taken if it had not been necessary to withdraw the cold turbid water core.

Processes and apparatus have been heretofore designed for freezing clear, clean ice cakes from raw, non-distilled water with the intent to obviate the necessity for the withdrawal of the water core containing the suspended matter, but the equipment required is very expensive, and the results produced have not been satisfactory.

Our process and apparatus provide an inexpensive, an economical, and at the same time, an efficient improvement in the manufacture of ice from raw water, so as to produce the required clean, clear ice without withdrawing the water core.

In carrying out our process, we provide in the can containing the raw water to be frozen, means for agitating the water during the freezing process. This prevents the freezing of air bubbles in the ice cake and keeps the suspended matter in action and gradually drives said suspended matter toward the center of the ice block, as heretofore. In the freezing can, but above and entirely clear of the body of water in said can, we provide a separation device, such as an overflow settling pan, and we associate with said separation device, means for transferring the agitated turbid water containing the suspended matter to said separation device continuously throughout the freezing process. The separation device is constructed so as to return the water to the center of the can. As a result, a separation process by means of which the suspended matter is removed from the water is continuously carried on, and the water, free of the suspended matter, is returned directly to the center of the freezing can without increase of temperature.

The devices for producing the agitation and for elevating the turbid water to the separation device are removably supported in the center of the can and are made of comparatively small cross sectional area. When the block or cake is frozen through to the comparatively small space surrounding these devices, they are removed and the water in said space, which is comparatively free of suspended matter and air particles, is allowed to freeze. This finishes the process. The resulting ice cake is clear and clean.

Thus the loss of efficiency in the ordinary freezing of ice cakes from raw water due to the removal of the turbid water core and to its replacement by water of a higher temperature, is entirely obviated.

We have shown herein a simple apparatus for carrying out our process and have illustrated the same in the accompanying drawings.

In the drawings:—

Figure 1 is a view representing a vertical central section through an ice freezing can or tank of familiar kind provided with a form of apparatus for carrying on the process hereinbefore outlined.

Fig. 2 is a top plan view of the apparatus with the floor plate above the same removed.

Fig. 3 is a perspective view of a settling pan forming part of the apparatus in the embodiment of the invention illustrated in the drawings.

Fig. 4 is a view representing on an enlarged scale in vertical sectional elevation, the lower end of the agitating and turbid water removing apparatus.

Fig. 5 is a similar view of a modified form of the same.

Referring now to the apparatus shown in the drawings: 10 indicates one of a plurality of ice cans which are open at the top and which rest upon stringers 11, supported below the flooring in a familiar manner. 12 indicates removable floor plates supported on floor frame members 13. These floor plates may be lifted to give access to the ice cans for filling, for inspection and for other purposes. 14 indicates the freezing mixture such as brine surrounding the ice cans. The can contains water at the level indicated in the drawings and as shown, 15 indicates the frozen part of the body contained in the can and 16 the unfrozen part. As is well understood, the thickness of the frozen part 15 gradually increases on all sides from the upright walls of the can toward the center.

In the apparatus shown herein, we provide an air blast for producing the necessary agitation in the water during the freezing process. This blast is carried through a pipe 17 of comparatively small diameter, which depends into the water contained within the can to a point near the bottom of the can. Above and entirely clear of the water in the can is located a separating device 18, which in this case, is shown as an overflow settling pan. Said pan is provided at its ends with suitable hooks 19, by means of which it may be hung from the top edges of the ice can. This separating pan is substantially of the same shape in plan view as the freezing can, but somewhat smaller in order to fit easily within the same. It has an outer, upright wall 20, and is provided at the center with an opening 21 defined by an upright wall 22 which is of less height than the outer wall 20. This last named wall constitutes the overflow wall of the pan and as the pan is continuously filled above this wall from the beginning of the freezing process, the water will run over the top edge of said wall and flow into the freezing can 10.

To elevate the water to the separating pan, we provide the following construction: 23 indicates a pipe of somewhat larger diameter than the air blast pipe 17. Said pipe 23 surrounds the pipe 17 and extends substantially the length thereof but its bottom end 24 is located somewhat above the bottom end of the pipe 17. The pipe 23 extends through the aperture 21 in the settling pan and has fixed to its upper end a T-pipe 25, the ends of which extend beyond the overflow wall 22 of the drain pipe and depend into the drain pan slightly below the top edge of said wall. In the pipe 17 at a point above the bottom end 24 of the pipe 23, we provide a small opening or aperture 26. An air blast at low pressure (preferably at three or four pounds above atmosphere), is supplied to the pipe 17 through a flexible pipe 27, which is connected by an elastic nipple 28 to the top end of the pipe 17 in a familiar manner.

The operation is as follows: The air blast escaping from the bottom end of the pipe 17 below the bottom end of the pipe 24 bubbles up through the water contained in the freezing can and agitates it in the usual manner. In addition, a small stream of the air is directed out through the hole 26 into the confined space between the inner pipe 17 and the outer and larger pipe 23. This air, in rising, acts to produce an upward movement or current of water through the space between the two pipes, with the result that the water is conveyed up to the T-pipe 25 by means of which it is directed into the settling pan. As fast as this water travels upward, its place is taken by the water in the space between the two pipes below the hole 26 of the pipe 17. The head, due to the weight of water in the can, forces the water in the freezing can outside the pipe 23 up through the space at the lower end of the pipe 17. Thus, as the suspended matter is caused to approach more and more toward the center of the can, during the freezing process, as heretofore described, and as the heavier particles naturally seek the bottom of the can, the turbid water is gradually and continuously extracted from the can and directed into the settling pan 18. Herein the heavier suspended particles settle to the bottom of the pan, while the water itself, as the pan becomes filled above the overflow wall 22, skims back into the can. There is thus a substantially continuous interchange between the can and the settling pan,—the turbid, dirty water being driven from the central part of the water body at the bottom of the can to the settling pan and the clean, clear water being returned in a substantially continuous stream to the central part of the body of water at the top of the can.

In order to check the water in its return from the settling pan and thus give time for the separation out of the suspended material, and in order to somewhat distribute the overflowing water in an even manner about the outer surface of the pipe 17, we determine the efficient height of the overflow wall 22 by means of annularly spaced discharge openings 29 (see Fig. 3). These are easily formed by cutting out parts 30 of the metal and bending them down, as clearly illustrated.

In Fig. 5, we have illustrated a modified form of the general type of device shown in the other drawings to provide for the simultaneous agitation by an air blast, of the water in the ice can and for the elevating and transferring of the water contained in the suspended matter from said can to the settling pan located above it. In this case 17ª indicates the inner air blast pipe and 23ª indicates the outer larger pipe surrounding the same. The pipe 17ª, instead of being extended below the surrounding pipe as in the previous case, terminates short of the bottom end of the pipe 23ª and there are provided at about the level of the bottom end 24ª of the pipe 17ª, openings 31 in the surrounding pipe 23ª.

The same result is produced in this construction as in the case first described. Part of the air blast is driven below the bottom end of the pipe 23ª, whence it passes up into the surrounding body of water and agitates the water and the suspended particles therein. A part of it also escapes about the bottom edge of the pipe 24ª and, passing up through the space between the pipe 17ª and the pipe 23ª, forces the water up through the space confined between said pipes and the surrounding water in the can is driven in through the opening 31 under the force of the head of water in the freezing can and flows, in the upward current produced, to the separation pan.

After the ice cake has been frozen up to the sides of the outer tube 23 (23ª), the two tubes are withdrawn and the freezing process is allowed to continue until the block is solidly frozen. The small amount of water left in the center when the two tubes are withdrawn is substantially clear and the ice will freeze without any appearance of a dirty core.

In describing an apparatus for carrying out our improved process, we have referred to preferred forms, each of which embodies an apparatus in its simplest form. It is to be understood, however, that the invention, as far as the apparatus is concerned, is not limited thereto and that the process may be carried out by other apparatus.

We claim as our invention:

1. The process of making ice cakes, which consists in freezing raw water in a suitable container, in agitating the water therein during the freezing process, in elevating the agitated water from the bottom and center of the container in a substantially continuous stream to a vessel above the water in the can, wherein the solid matter is separated by maintaining the water in a substantially quiescent state, and then returning the water by gravity free of the solid matter to the freezing water in the container.

2. In an apparatus for freezing ice cakes, in combination with the can adapted to contain the body of water to be frozen, a separation pan located above said freezing can, removable means for agitating the water within the freezing can, removable means for continuously elevating the agitated water from a point substantially at the center and bottom of the freezing can to the separation pan, and means providing for the continuous return of the water in the separating pan to the top of the water at the center of the freezing can.

3. In an apparatus for freezing ice cakes, in combination with the can adapted to contain the body of water to be frozen, a separation pan located in the top of the freezing can but clear of the water therein, said separation pan being adapted to drain toward the center of said freezing can, a pipe depending into said can with its bottom end extending to a point near the bottom of the can and with its upper end constructed to discharge into said separation pan, an air blast pipe of smaller diameter than said first named pipe, depending through said first named pipe, said two pipes being removable from the tank and being constructed and arranged in such manner that an air blast delivered through the one pipe will be discharged into the freezing can for agitating the water therein and that a part of the blast will be discharged into the confined space between the two pipes in such manner as to force the water under the action of the head in the freezing can up between the two pipes into the separation pan.

4. In an apparatus for freezing ice cakes, in combination with a can adapted to contain the body of water to be frozen, a settling pan detachably suspended from the top of said can and adapted to overflow at its center into said can, a combined agitating and water elevating device removably suspended within said can and extending to a point near the bottom of the same, said device comprising a larger pipe provided at the top with a discharge member adapted to discharge into the settling pan, and a smaller air blast pipe extending through the discharge member of the first pipe and throughout the length of the first pipe to a point below the bottom end of said first pipe, said blast pipe being provided with a hole for the discharge of air at a point above the bottom end of the first named pipe, and means for supplying a blast of air to the blast pipe.

In testimony that we claim the foregoing as our invention we affix our signatures in the presence of two witnesses, this 28th day of October A. D. 1915.

JOHN P. BOYLE.
WALTER A. INMAN.

Witnesses:
T. H. ALFREDS,
KARL W. DOLL.